(12) United States Patent
Gyllenhammar (10) Patent No.: US 11,156,058 B2
(45) Date of Patent: Oct. 26, 2021

(54) METHOD AND SEALING MEDIUM FOR PLUGGING OF A WELL

(71) Applicant: CaMa GeoScience AS, Stavanger (NO)

(72) Inventor: Carl Fredrik Gyllenhammar, Stavanger (NO)

(73) Assignee: CaMa GeoScience AS, Stavanger (NO)

( * ) Notice: Subject to any disclaimer, the term of this patent is extended or adjusted under 35 U.S.C. 154(b) by 0 days.

(21) Appl. No.: 16/634,015

(22) PCT Filed: Jul. 23, 2018

(86) PCT No.: PCT/NO2018/050196
§ 371 (c)(1),
(2) Date: Jan. 24, 2020

(87) PCT Pub. No.: WO2019/022614
PCT Pub. Date: Jan. 31, 2019

(65) Prior Publication Data
US 2020/0208493 A1 Jul. 2, 2020

(30) Foreign Application Priority Data

Jul. 28, 2017 (NO) .................................. 20171264

(51) Int. Cl.
*E21B 33/13* (2006.01)
*C04B 28/00* (2006.01)
(Continued)

(52) U.S. Cl.
CPC ............ *E21B 33/13* (2013.01); *C04B 28/001* (2013.01); *C09K 8/426* (2013.01); *C09K 8/46* (2013.01)

(58) Field of Classification Search
CPC ......... C04B 28/02; C04B 14/08; C04B 14/06; C04B 14/10; C09K 8/46; C09K 8/426;
(Continued)

(56) References Cited

U.S. PATENT DOCUMENTS 3,557,876 A 1/1971 Tragesser
4,372,786 A * 2/1983 Reed ...................... C09K 17/08
405/263

(Continued)

FOREIGN PATENT DOCUMENTS

GB 2161187 A * 1/1986 ............ C09K 17/12
PL 159733 1/1993
(Continued)

OTHER PUBLICATIONS

Paper #2-25 Plugging and Abandonment of Oil and Gas Wells, Working Document of the NPC North American Resource Development Study, Sep. 15, 2011, pp. 1-21.
(Continued)

*Primary Examiner* — Zakiya W Bates
(74) *Attorney, Agent, or Firm* — Andrus Intellectual Property Law, LLP (57) ABSTRACT

A method for sealing at least a portion of a well can include the step of injecting the sealing medium into the portion of the well which is to be sealed, wherein the sealing medium comprises quick clay. The sealing medium can be configured for facilitating the removal of casing from a well.

18 Claims, 12 Drawing Sheets

(51) Int. Cl.
*C09K 8/42* (2006.01)
*C09K 8/46* (2006.01)

(58) Field of Classification Search
CPC ........... C09K 8/516; C09K 8/42; E21B 33/13; E21B 33/14; E21B 47/005
See application file for complete search history.

(56) References Cited

U.S. PATENT DOCUMENTS

| | | | |
|---|---|---|---|
| 5,423,379 A | 6/1995 | Hale et al. | |
| 5,439,056 A | 8/1995 | Cowan | |
| 6,102,621 A * | 8/2000 | Siegrist | B09C 1/00 405/128.5 |
| 6,547,710 B1 * | 4/2003 | Patel | C08F 8/36 525/344 |
| 2009/0205828 A1 | 8/2009 | Hermes et al. | |

FOREIGN PATENT DOCUMENTS

| | | | | |
|---|---|---|---|---|
| WO | WO-2016048332 A1 * | 3/2016 | | C09K 8/44 |
| WO | WO-2016175774 A1 * | 11/2016 | | F24T 10/10 |

OTHER PUBLICATIONS

Norwegian Search Report for NO 20171264, dated Feb. 27, 2018.
International Search Report and the Written Opinion for PCT/NO2018/050196, dated Oct. 2, 2018.
Response to the Written Opinion for PCT/NO2018/050196, dated Nov. 9, 2018.

* cited by examiner

METHOD AND SEALING MEDIUM FOR PLUGGING OF A WELL

CROSS-REFERENCE TO RELATED APPLICATIONS

This application is the U.S. national stage application of International Application PCT/NO2018/050196, filed Jul. 23, 2018, which international application was published on Jan. 31, 2019, as International Publication WO 2019/022614 in the English language. The International Application claims priority of Norwegian Patent Application No. 20171264, filed Jul. 28, 2017. The international application and Norwegian application are both incorporated herein by reference, in entirety.

FIELD

The invention concerns a method of sealing at least a portion of a well. The invention is concerned with sealing of a well in different stages of the lifetime of a well. Such sealing can be the sealing between a casing and the wall of the well during the early stages of the installation of a casing in a well, and the final sealing of the well when the well is abandoned. The invention also concerns a sealing medium for sealing of a well.

BACKGROUND

Herein, the term "well" is used for different types of wells, such as a petroleum well, a coal seam gas well, a geothermal well, a well for injection of $CO_2$, or a well for depositing of material.

There are different situations in which it is necessary to seal at least a portion of a well. For instance, during installation of a casing in a new well, it is necessary to seal the annulus between the casing and the wall of the well. This is normally done by cementing the casing to the wall of the well. The cement in this situation also offers structural support to the casing and helps protect the casing from corrosion.

When a well is being abandoned it needs to be plugged securely in order to prevent leakage. Normal procedure when a well is being abandoned is to remove as much as possible of the casing and plug the well with cement plugs, normally two cement plugs for petroleum wells, and/or mechanical plugs. The rest of the annulus may be filled with a mix of drilling fluid and cement slurry.

Prior art sealing with cement plugs as described above, has the disadvantage that cement inevitably starts to crack up after a certain time period, or for instance in case of compaction and/or tectonic movement. When the cement plugs crack up, leakages may occur, and this could have detrimental consequences.

Leakage do not only occur due to cracks in the cement plugs, but also due to cracks in the well in sections filled with drilling fluid, cement spacer, cement slurry, and/or mixtures of these. Leakage may also occur prior to formation of cracks in the cement plugs for instance because of uneven cementing. Also, in the upper part of the well, where the well cannot be filled with cement, leakage may occur when the production tree is removed.

It is also known from the prior art to use swelling clay minerals like bentonite to close fractures in a well. Two disadvantages with this kind of sealing material, is that it swells fast and might not get in the right place before it swells, and that, because of the swelling, it might actually create new fractures.

SUMMARY

The invention has for its object to remedy or to reduce at least one of the drawbacks of the prior art, or at least to provide a useful alternative to prior art.

The object is achieved through features, which are specified in the description below and in the claims that follow.

The invention is defined by the independent patent claims. The dependent claims define advantageous embodiments of the invention.

In a first aspect the invention relates more particularly to a method for sealing at least a portion of a well, the method comprising the step of injecting a sealing medium into the portion of the well which is to be sealed, wherein the sealing medium comprises quick clay.

Quick clay is sometimes referred to as sensitive clay. Quick clay is a water-saturated clay that changes rapidly to a fluid state when jarred or crushed. Quick clay is any glaciomarine or marine clay which is stable as long as it retains its original ionic content or salt concentration, but which becomes unstable when lifted up close to sea level or above sea level and the salts are gradually washed/leached out of the clay. In general, a concentration of less than 2 g/l of salt is regarded as the threshold for a clay deposit to be a potential quick clay if stirred. It was earlier considered that a low salt content, as a result of leaching, was the primary factor for the formation of quick clay. The original quick clay model proposed by Rosenkvist (1946), which is based on experience from Norwegian clays found around Oslo, such as the Sinsen road intersection. Later research by Talme (1968), Söderblom (1969) and Penner (1965), among others, has shown that a low salt content is a precondition for high sensitivity, but that this condition alone is not always sufficient. The water content is also very important. Onshore clay deposits with low salt concentration will be stable if the water content is low (Rankka et al, 2004).

Typically, quick clay may include clay minerals like illite and chlorite, in addition to quartz as sand or silt, and some other minerals such as feldspars. In general, quick clay do not contain smectites such as montmorillonite, vermiculite, or bentonite. However, it must be understood that when used herein, the term "quick clay" also includes any naturally occurring or artificially made materials which have properties resembling those of naturally occurring quick clays. The term quick clay is herein also used to capture clay deposits which today have very low salt concentration due to leaching, but which are stable due to low water content. Just by adding water they will become liquefied and unstable. The term quick clay as used herein thus includes any natural or artificial material which has the ability to take the form of a thick liquid when being stirred/moved, to become more solid, but still flexible and unhardened when left to settle, and then being able to liquefy again if stirred.

Quick clays and/or sensitive clays are found in areas which were glaciated during the Pleistocene epoch (1.65 million to 10,000 years ago). They have mainly been identified in northern Russia, Norway, Finland, Sweden, Canada and Alaska. These areas are characterised by isostatic uplift which took place after the retreat of the ice. The development of very high sensitivity is usually the result of processes that have taken place after the deposition of the clay layers. All sediments with quick properties are young in a geological sense. Most of them are deposited in sea water but in some cases also in brackish or fresh water.

Clay minerals are so-called secondary minerals that have been formed by weathering of other silicates such as mica, amphibolites, and feldspar. Chemical weathering is a process whereby a mineral or rock is broken down by the action of water alone or in combination with substances from the air or the soil layers.

Most of the known quick clay and sensitive clay deposits consist of a mix of clay minerals having a low cation-exchange capacity (CEC). That means that swelling clays such as montmorillonite and vermiculite (smectites) are not present. The CEC-value of smectite, montmorillonite, and bentonite is around 100 meq/100 g, whereas the CEC-value of illite and chlorite is about 20 meq/100 g.

Experiments have shown that quick clay can be dried and crushed to powder. This makes transportation easy. When water is added to the powder, the mix becomes quick clay with the same physical character as the original quick clay.

The effect of utilizing quick clay to plug a well is that a sealing means is obtained which is flexible and adjustable to any movement in the well. If quick clay is used when a casing in a well is installed, the casing may, instead of being fastened to the wall of the well by means of cement, be steadily, but not fixedly supported by quick clay filling the annulus between the casing and the wall of the well. Quick clay will not harden and thus will also not crack up during the lifetime of the well. If the quick clay is stirred or unsettled due to tectonic, or other, movement, it will readjust and resettle. Quick clay, being flexible, will move into any new cracks and will also, for instance, fill areas wherein old casing is rusting away. Therefore, quick clay constitutes a safer and more reliable sealing medium for a well, than cement which is the most commonly used sealing medium in wells.

This means that quick clay, while being pumped into a well, is liquid. Left in the well to settle, it becomes stable and forms a reliable and flexible plug. The plug will not crack up due to any movement in the ground since it will be flexible and move together with the ground, and thus readjust to safely plug any new cracks in the ground.

Samples from the quick clay of the Sørum slide in Norway have been run through two different tests. First, the mineralogical composition was analyzed using XRD at the University of Oslo. The analysis showed a pure clay mix of non-swelling clay minerals; only illite and chlorite. The few sand and silt grains that was identified was quartz, potassium feldspar, plagioclase feldspar, and some calcite and pyrite.

Second, a rheology test was run on the clay at the University of Stavanger. The idea to test the quick clay was initiated by the observation that quick clay in liquid state which was collected in sealed containers and left, would quite quickly become stable again.

The idea was to find out if more water could be added to the quick clay without it losing its ability to re-settle into solid state.

TABLE 1 rheology test, sample weight, density, and added water.

| Sample | Initial weight (g) | Initial density | Added water (g) | Sample density |
|---|---|---|---|---|
| 1.00 | 875.44 | 1.95 | 20.12 | 1.91 |
| 2.00 | 875.00 | 1.95 | 30.00 | 1.89 |
| 3.00 | 874.96 | 1.95 | 50.05 | 1.85 |

In situ, the quick clay density was 2 g/cm$^3$ and the quick clay behaved like a fluid. Within a few days it settled. Water was added to reduce the density to 1.9 g/cm3, but after a week this slurry would also first gel, then harden so that the container could be turned upside down without any quick clay falling out. However, the quick clay would never solidify completely. Not even by adding salt it would get as hard and brittle as for instance concrete.

The sedimentary deposits of most hydrocarbon bearing sedimentary basins include relatively large salt deposits making most basins quite saline. The North Sea, the Norwegian Sea and the Barents Sea are all quite saline basins where the salinity in the reservoir can reach saturation at 440 g/l water. The least saline basins offshore of Norway is the Haltenbanken where there are salt layers, but no salt walls or diapers. A recent study of the salinity of reservoir layers of Haltenbanken, which includes measurement from more than seven hundred reservoir levels, shows an average of 56 g/l. Salt will diffuse slowly and naturally into the low salinity quick clay forming the plug in the well, by diffusion. This will slowly change the plug into a natural part of the surrounding rock, but it will not solidify completely.

An extra advantage of quick clay sealing medium compared to prior art swelling clay plugs (like bentonite) is that the quick clay may be used in deeper wells. Because of the fast swelling of bentonite and similar plugging material, this may not be used for locations deeper than 2000 metres because the material would swell before it reaches the correct location.

The sealing medium may in one embodiment consist only of quick clay.

The sealing medium may be injected through a drill string. It is easier to target the relevant portion of the well when a drill string is used. The alternative would be to pump the sealing medium into the well directly from the surface.

At least one casing string may be installed in the well.

The portion of the well may be an annulus between the casing string and a wall of the well and/or an annulus between two casing strings. A leakage may occur in one of the annuli, the casing may then be perforated and the sealing medium containing the quick clay may be injected into the annulus, thus stopping the leakage. The entire annulus may be filled with quick clay containing material in order to prevent leakage, and to support the casing. Quick clay may render the conventional cementing of casing superfluous.

The drill string may be provided with a mechanical plug, such as a bridge plug provided with a rubber seal for sealing the space between the casing string and the drill string such that the sealing medium is prevented from flowing back along the drill string during injection of sealing medium. It is an advantage to use a temporary plug, for instance a rubber seal, to prevent flow-back of sealing medium, especially in cases where the sealing medium is being directed to a certain portion of the well, and where the casing is not meant to be filled with sealing medium.

The sealing medium comprising quick clay may be injected into the annulus during installation of the well. The effect of this is that the annulus will be filled with a material that is flexible and therefore will not crack up. Such a well will therefore be less prone to leakage than a conventional well. Furthermore, if the sealing medium with quick clay is used instead of cement when installing the casing in the well, the pulling of the casing when the well is later to be abandoned, will be much easier.

The method may, during abandonment of the well, comprise the step of:

disturbing the quick clay prior to or at the same time as pulling the casing strings, such that the quick clay becomes more fluid and thus facilitates the pulling of the casing strings. The effect of disturbing the quick clay is that the quick clay becomes more fluid and slippery. When the casing is pulled it will slide on the quick clay. This is a great advantage because the casings may be pulled out without considerable damage, and they may thus be reused to a larger degree than what is the case in conventional wells.

The step of disturbing the well may be performed by initiating the pulling of the casing like it would be done also in conventional wells (where the casing is cemented into place). The casing may be hammered on or pulled with high force such that the enclosing quick clay plug is disturbed.

The method may comprise the step of filling the entire well with the sealing medium for plugging the well. This would render the well completely sealed, making sure that no leakage would occur after abandonment of the well. As mentioned above, the properties of the quick clay would cause the sealing medium to adjust to any tectonic, or other, movement in the ground and thus seal any new cracks in the surrounding rock.

The method may comprise the step of altering the characteristics of the sealing medium by means of adding one of, or a combination of two or more of, water, salt, sand and silt. The characteristics of the sealing medium may be altered before and/or after injecting it into the well. In general, adding more water to a quick clay will make it thinner such that it flows more easily. Adding salt ions to a quick clay, mainly potassium and sodium ions, will make the clay more stable. Adding salt ions to the quick clay could be done in order for it to more quickly become stable after injection into the well. Adding sand, such as quartz or barite, will change the density of the quick clay. The same goes for adding of silt, of any mineral.

In a second aspect the invention relates more particularly to a sealing medium for sealing of a well, wherein the sealing medium comprises quick clay. Said sealing medium may be used in the method according to the first aspect of the invention.

In a third aspect the invention relates more particularly to the use of quick clay as a sealing medium in a well.

In a fourth aspect the invention relates more particularly to the use of quick clay for facilitating the removal of casing from a well.

BRIEF DESCRIPTION OF THE DRAWINGS

In the following are described one example of a well wherein the casing is cemented in the conventional way and where a sealing medium comprising quick clay is used for plugging the well, and another example where the sealing medium comprising quick clay is used instead of cement for securing the casing, wherein.

The figures are shown in a simplified and schematic manner, and details that are not important in order to highlight what is new about the invention may have been omitted from the figures. The various elements in the figures are not necessarily shown to scale relative to each other. Like or corresponding elements will be indicated by the same reference numeral in the figures.

Any positional specifications such as "over", "under", "above" and "below" reflect the position shown in the figures.

DETAILED DESCRIPTION OF THE DRAWINGS

Figure 1:
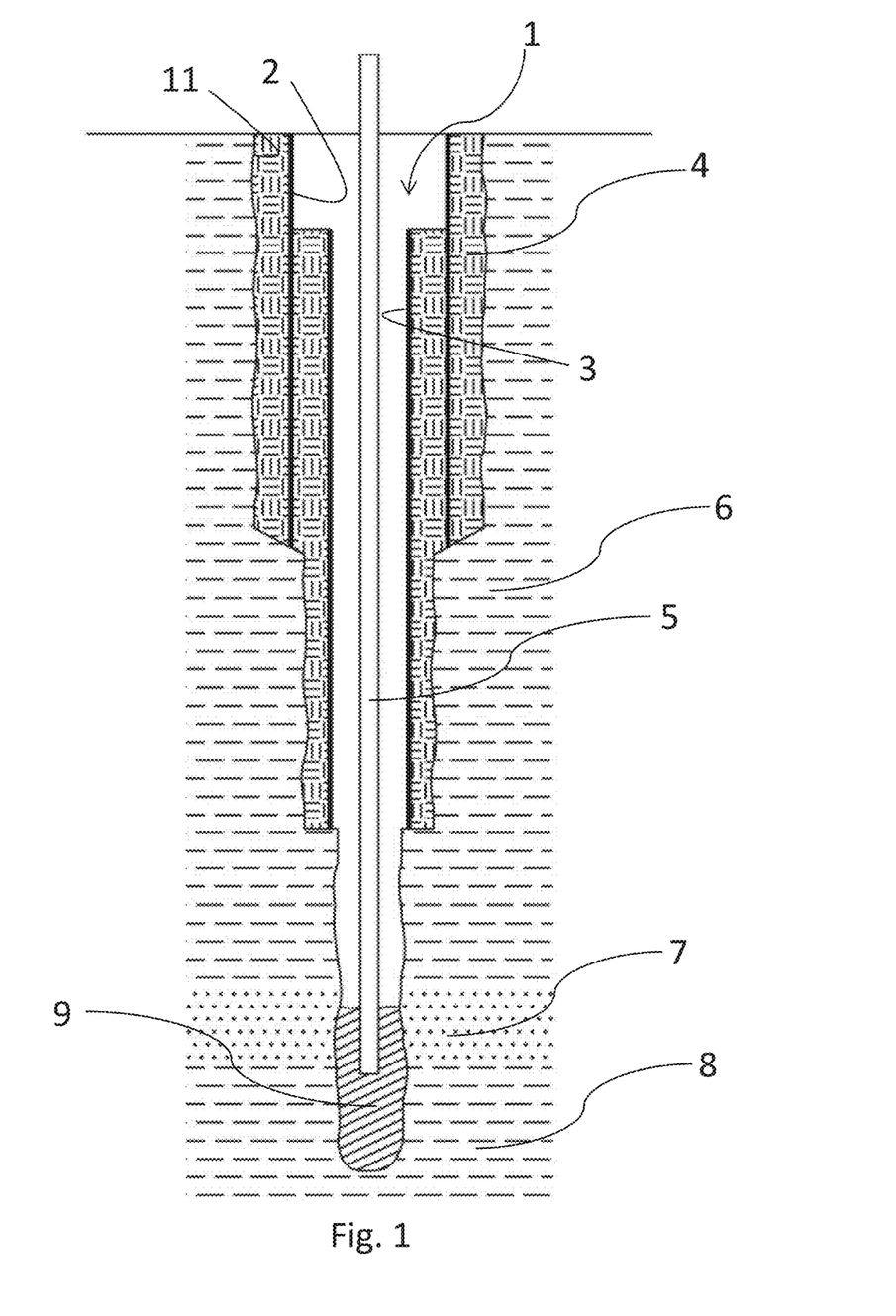
FIG. 1 shows a well wherein two casing strings are installed, and where the well is about to be plugged by the sealing medium.

Reference is first made to FIG. 1 which shows a cross-section of an already existing well 1 having a wall 11, wherein a first casing string 2 and a second casing string 3 have been installed. It is illustrated that cement 4 fills the annulus between the casing strings 2, 3 and the wall 11 of the well 1, as well as the annulus between the casing strings 2, 3. A drill string 5 runs from the surface and down into the well 1. In this example the well 1 has been drilled through a caprock 6 such as shale followed by a permeable layer 7, i.e. a reservoir rock, for instance sandstone. The well 1 has been further drilled into a source rock 8, again for instance shale. Furthermore, FIG. 1 illustrates that the well 1 is being filled with a sealing medium 9 containing quick clay. The sealing medium 9 will in the following be referred to as quick clay and the reference numeral 9 will be used both for quick clay and for sealing medium since a division of these does not make sense with regards to the drawings. It is referred to the definition of quick clay above, and it must be understood that by quick clay is herein meant any material with the faculties of quick clay. The sealing medium 9 of the invention has such faculties. The quick clay 9 is injected through the drill string 5. The quick clay 9 is injected in order to plug the well 1 such as to prevent leakage from the permeable layer 7 and to the surface when the well 1 is abandoned.

Figure 2:
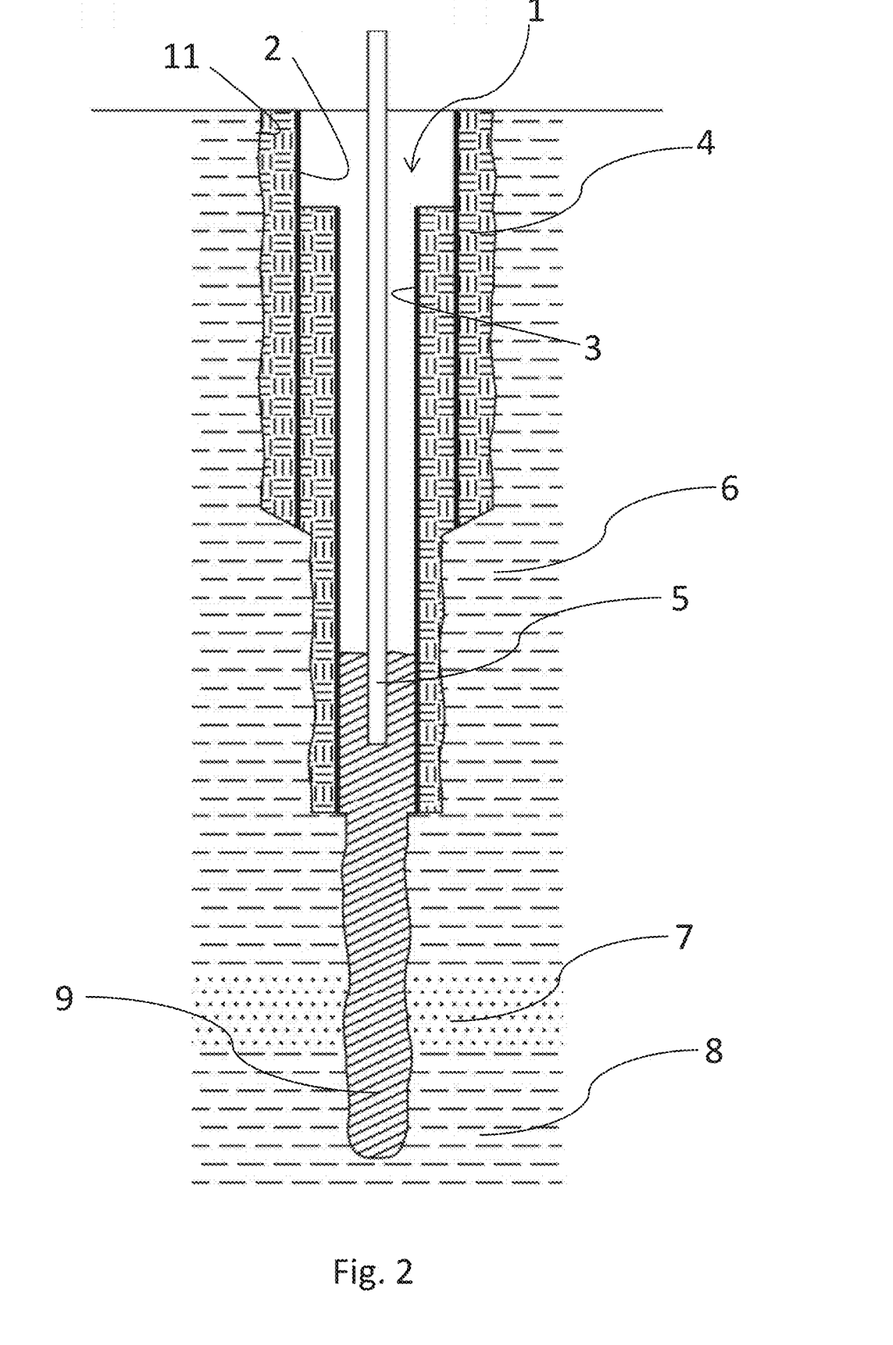
FIG. 2 shows the same as in FIG. 1, where the well has been further filled with sealing medium.

FIG. 2 shows the well 1 of FIG. 1 wherein the drill string 5 has been further pulled out of the well 1 at the same time as the well 1 is being further filled with quick clay 9. Preferably as much of the casing strings 2, 3 as possible should be removed before filling up the well 1 with quick clay 9.

Figure 3:
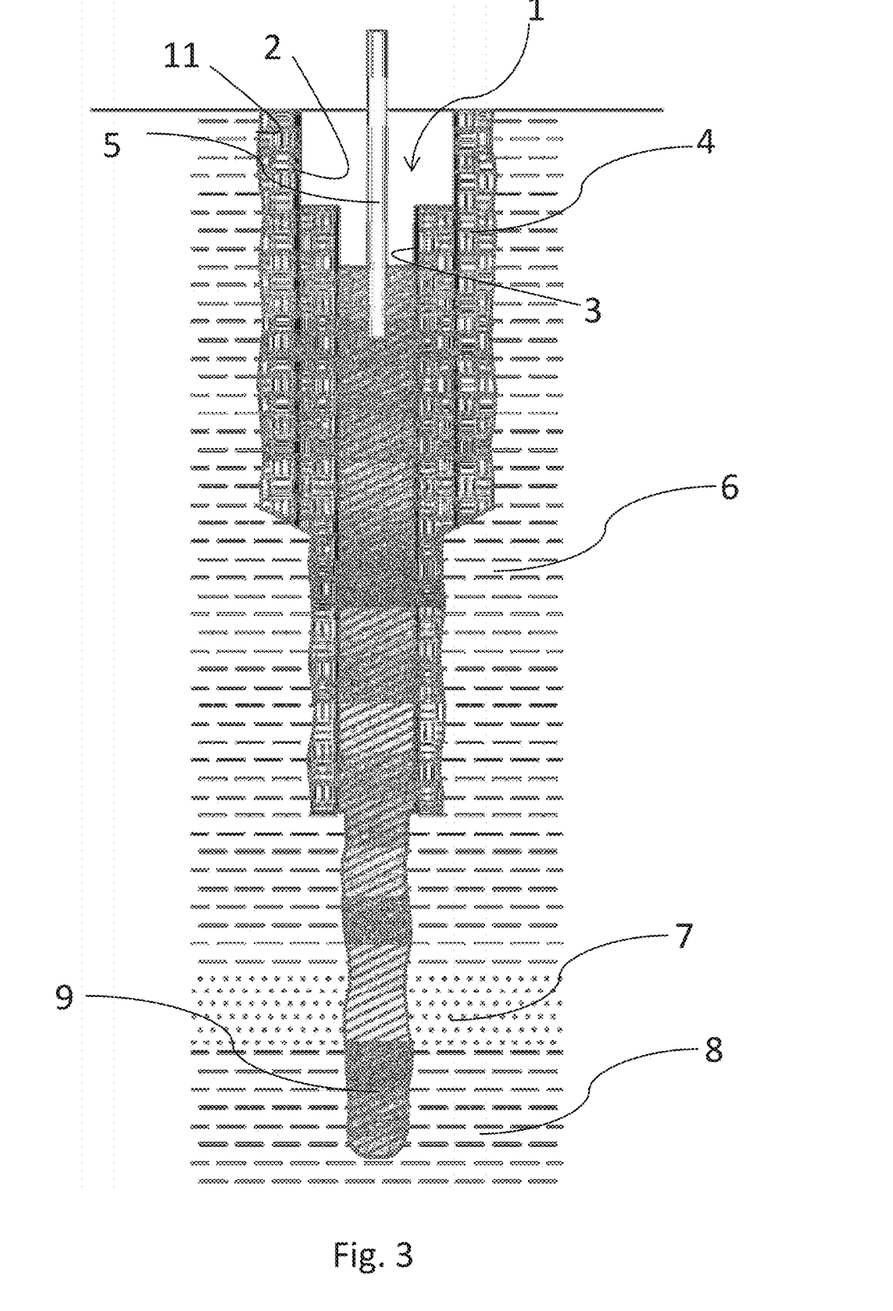
FIG. 3 shows the same as in FIG. 2, where the well has been almost completely filled with sealing medium.

FIG. 3 shows the well 1 of FIGS. 1 and 2 wherein it is almost completely filled with quick clay 9. The drill string 5 is backed out of the well 1 as it pumps quick clay 9 into the well. After filling the well 1 with quick clay 9, the quick clay 9 is left to settle. During pumping/injecting of the quick clay 9 into the well it is liquid, but when it is left to settle it gets more solid and stable. However, quick clay will never harden, and will thus always keep its flexible characteristics.

Figure 4:
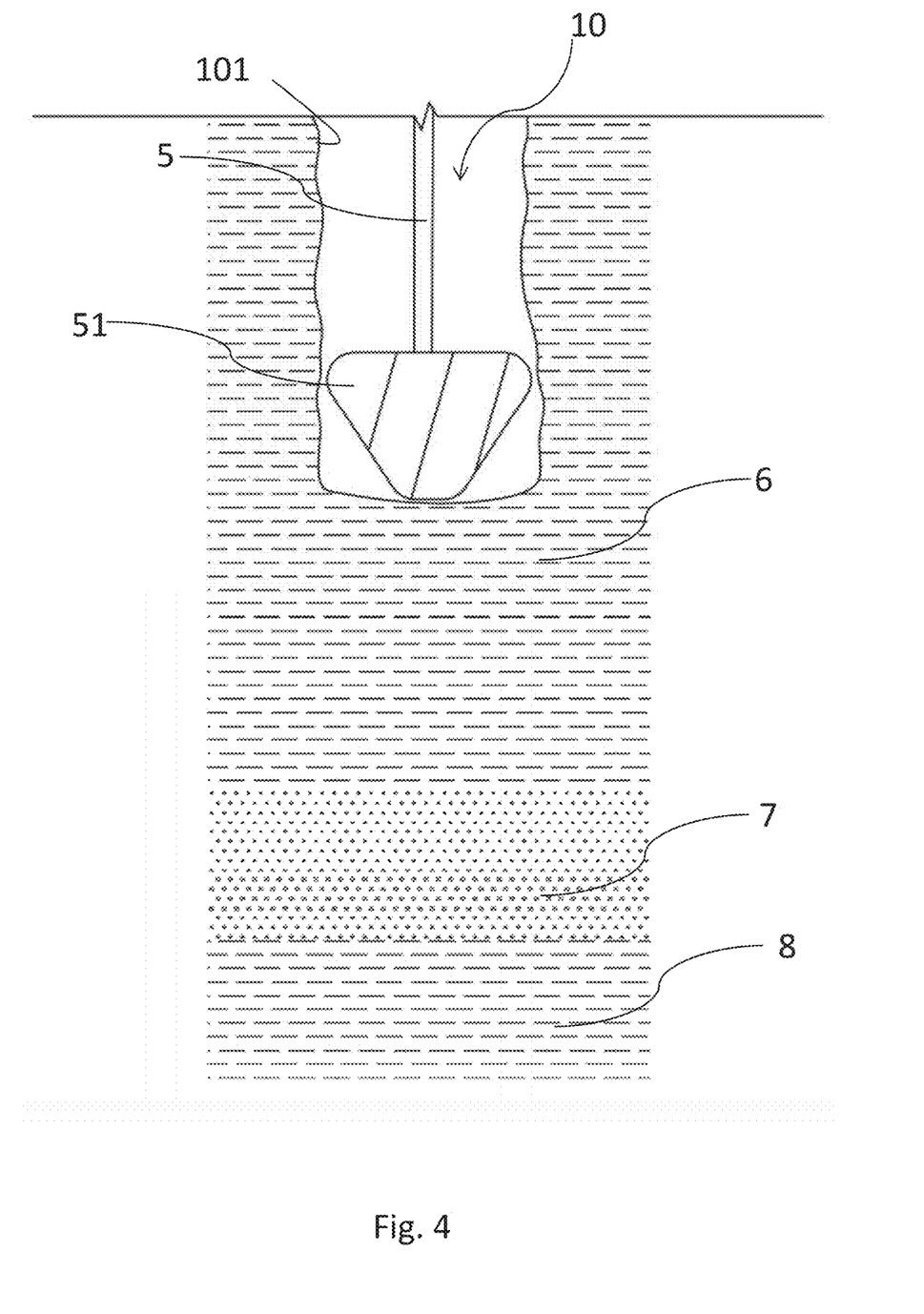
FIG. 4 shows a well in the process of being drilled.
Figure 5:
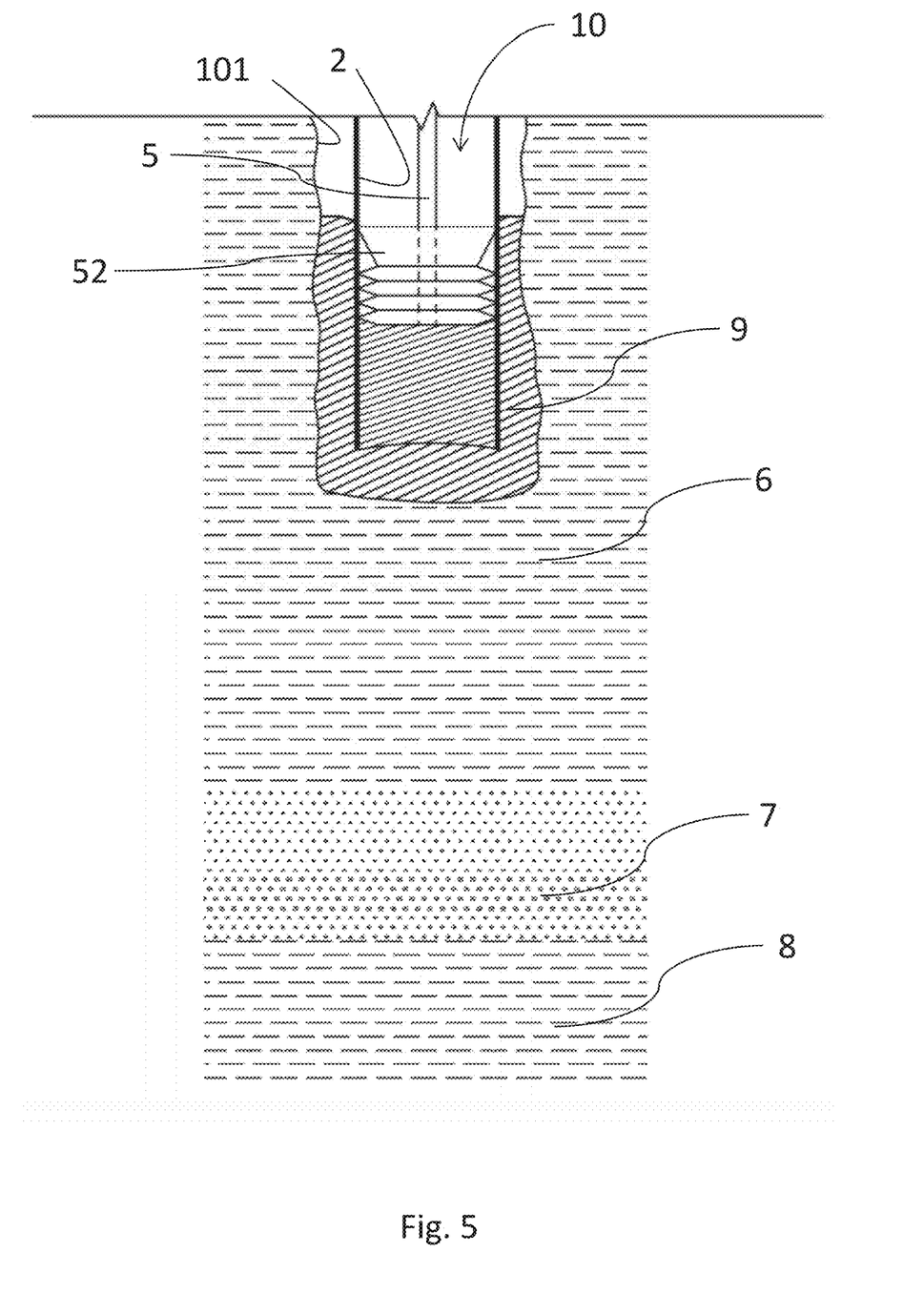
FIG. 5 shows the well of FIG. 4, wherein a casing has been run and wherein sealing medium is being injected into the well.

FIG. 4 shows a new well 10 in the process of being drilled by means of the drill string 5 comprising a drill bit 51. The wall of the well 10 is denoted 101. The strata of the ground are the same as in the previous example, namely caprock 6, reservoir rock 7, and source rock 8. On FIG. 5 the first casing string 2 has been installed. The drill bit 51, shown on FIG. 4, has been replaced by a rubber sealing plug 52 arranged on the drill string 5. Quick clay 9 is then pumped down through the drill string 5, through the rubber sealing plug 52, and out into the casing 2 below the rubber sealing plug 52. The rubber sealing plug 52 prevents the quick clay 9 from returning up along the drill string 5, and thus the quick clay 9 will be squeezed in the annulus between the wall 101 and the casing 2.

Figure 6:
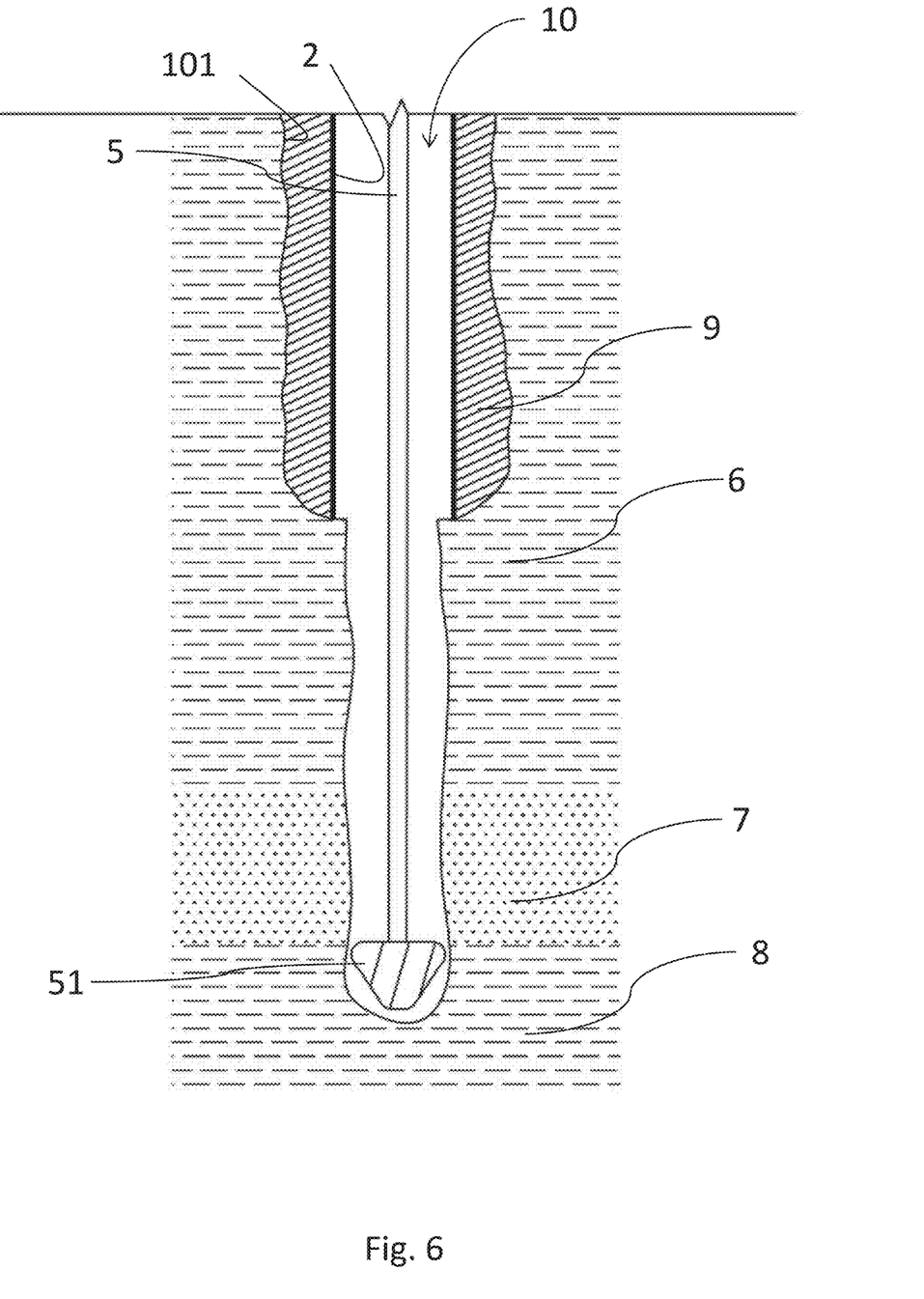
FIG. 6 shows the well of FIGS. 4 and 5 after installation of the first casing and during continued drilling.
Figure 7:
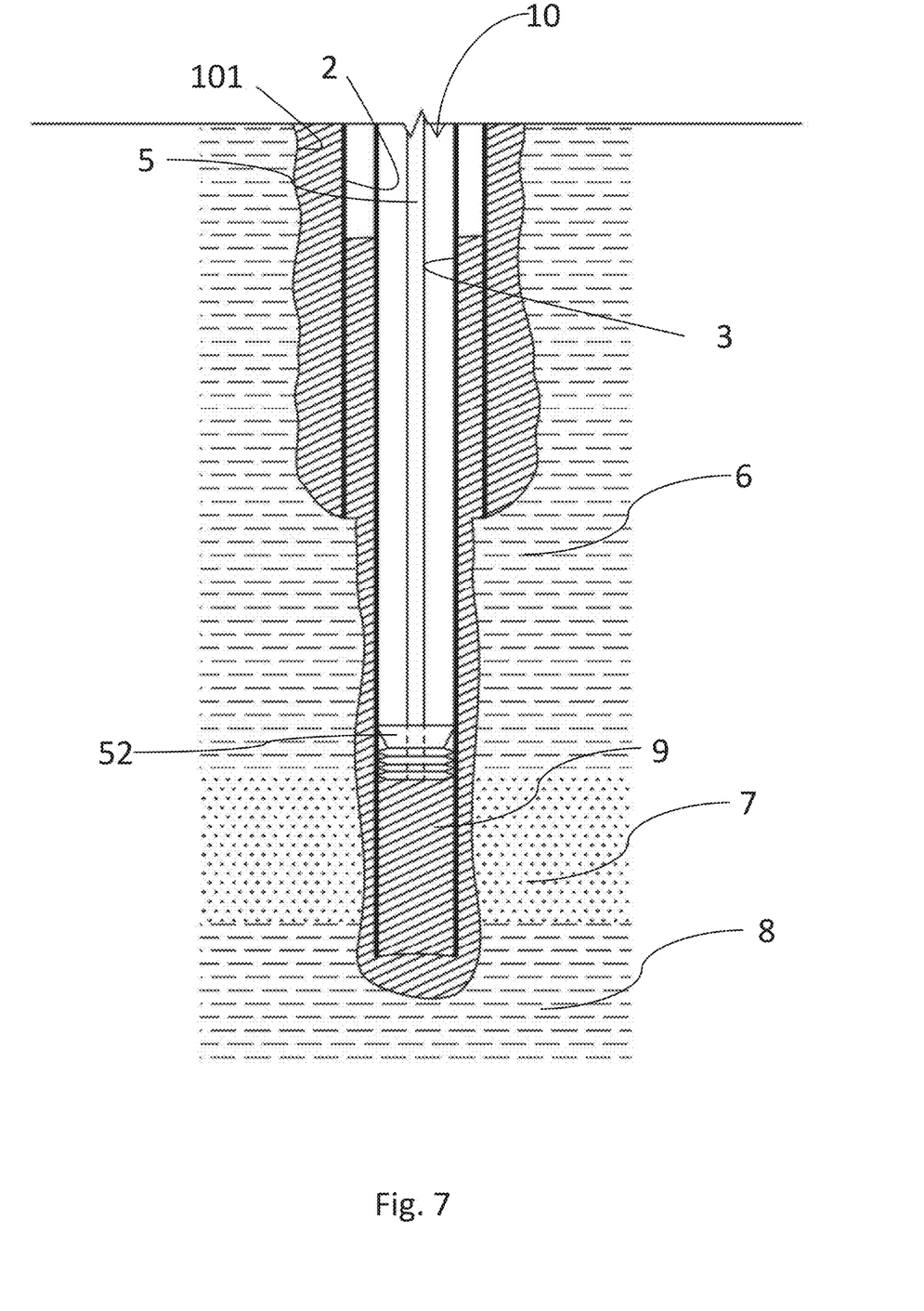
FIG. 7 shows the well of FIG. 6, wherein a second casing has been run and wherein sealing medium is again being injected into the well.

The quick clay 9 in this example replaces the cement of the conventional well 1 of FIG. 1. FIG. 6 illustrates how the first casing 2, also called the conductor, has been installed such that quick clay 9 is closed in in the annulus between the conductor 2 and the wall 101 of the well 10, before the drilling of the well 10 has been continued. On FIG. 7 the second casing string 3 has been run down into the well 10, and again the drill bit 51, shown on FIGS. 4 and 6, has been replaced by the rubber sealing plug 52 in order for quick clay 9 to be injected into the well 10 through the drill string 5 without returning back along the drill string 5. The quick clay 9 fills the annulus between the wall 101 of the well 10 and the second casing 3 as well as the annulus between the first casing 2 and the second casing 3.

Figure 8:
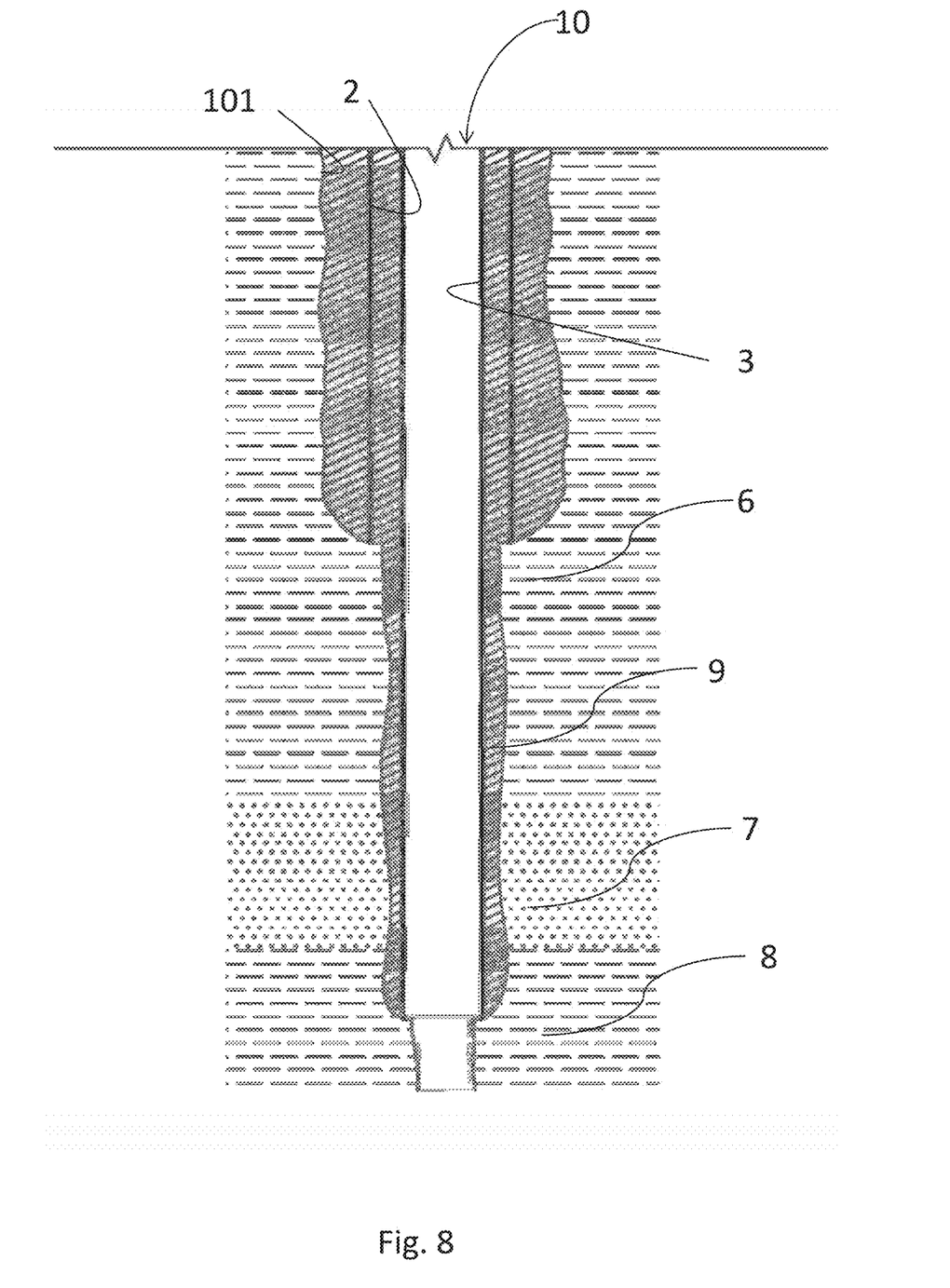
FIG. 8 illustrates that the well of FIG. 7 has been further extended and the sealing medium is contained in the annuli between the casing and the wall of the well, and in between the two casing strings.

FIG. 8 shows the well 10 ready for closing down after production has finished and all tools are pulled out of the well. The well 10 is ready for the "plug and abandon" procedure. Both casing strings 2, 3 are still in the well 10.

Figure 9:
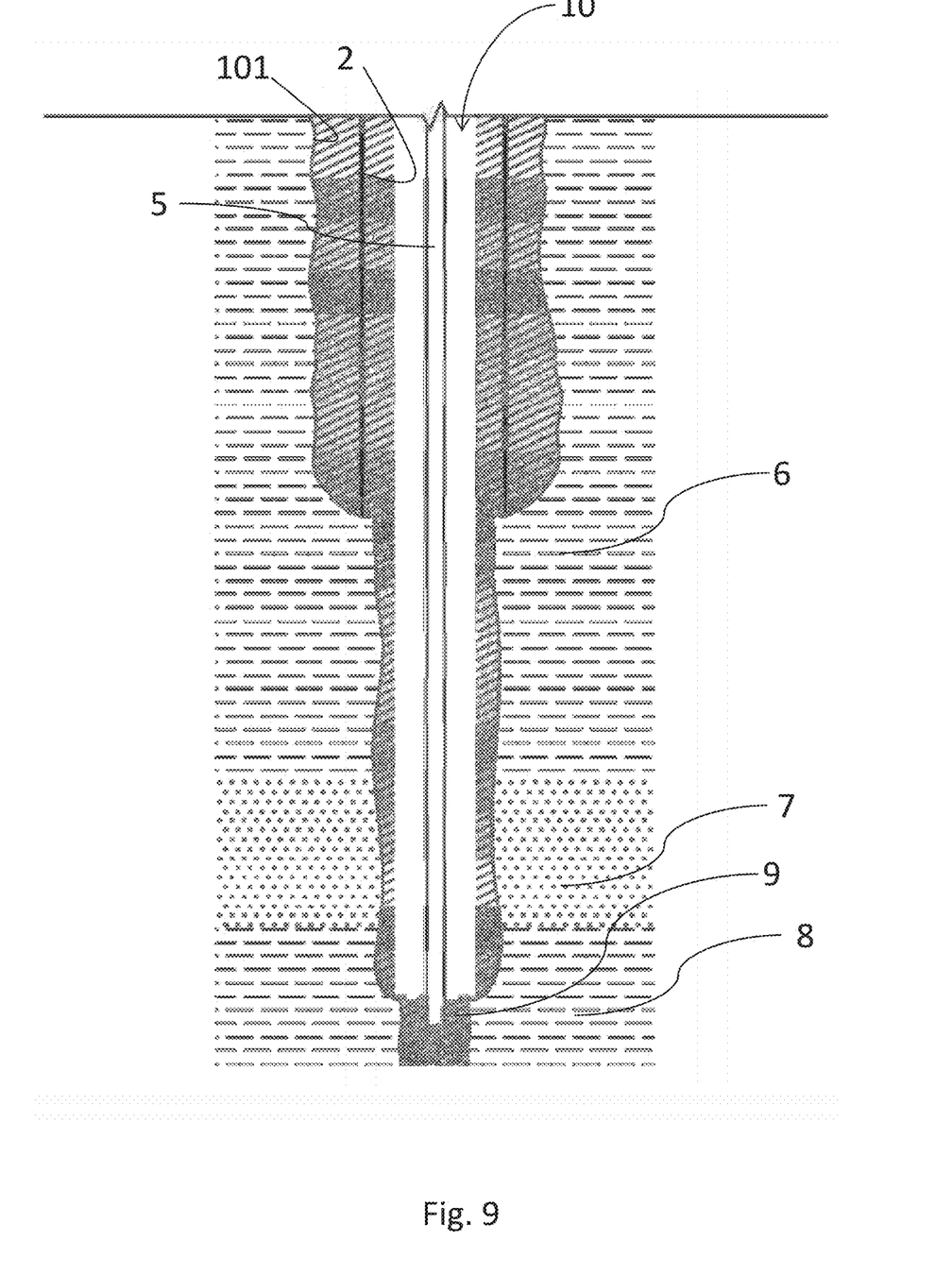
FIG. 9 shows the well of FIG. 8, wherein the well is being filled with sealing medium through the drill string and wherein the innermost casing is removed.
Figure 10:
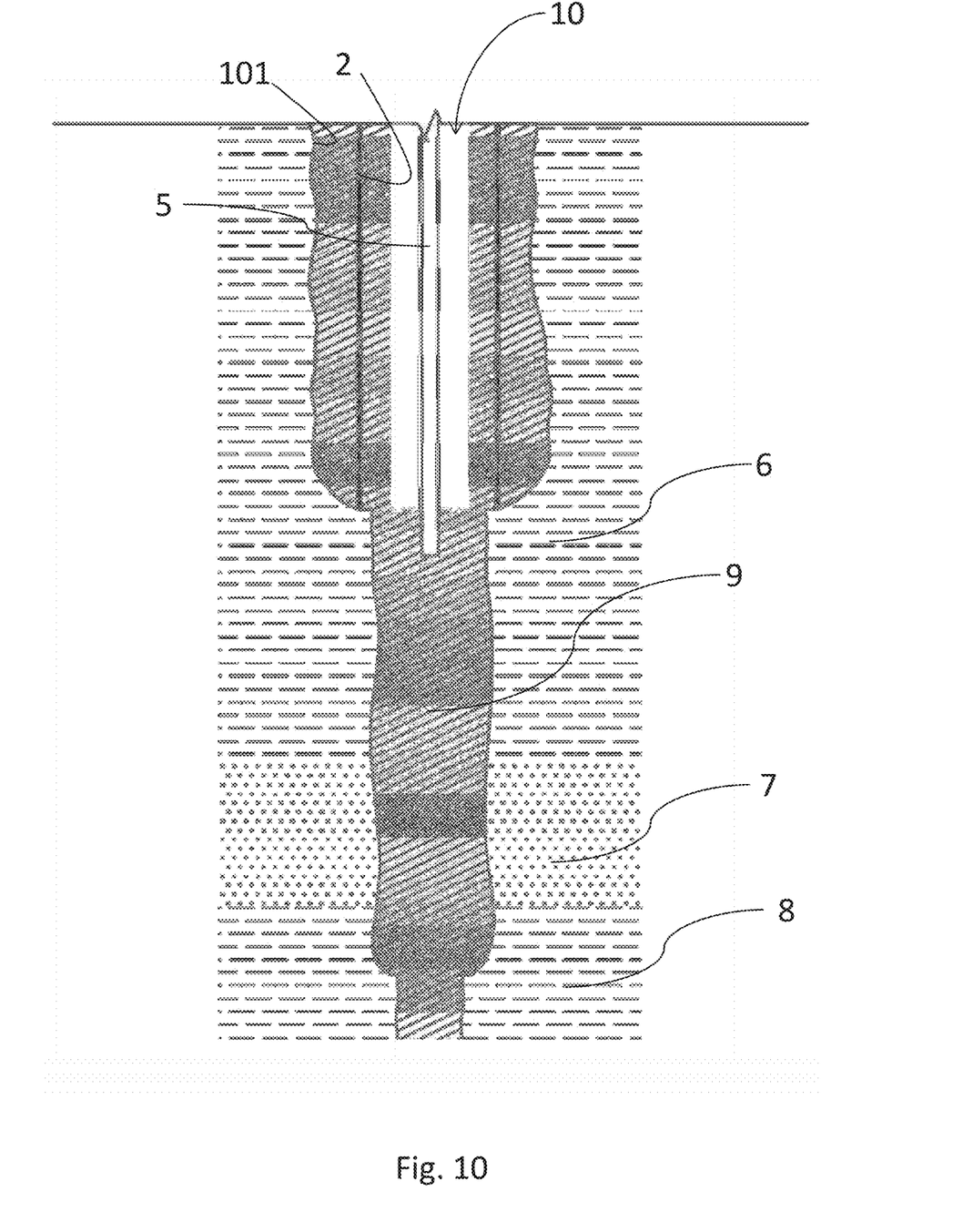
FIG. 10 shows the well of FIG. 9, further filled up with sealing medium.
Figure 11:
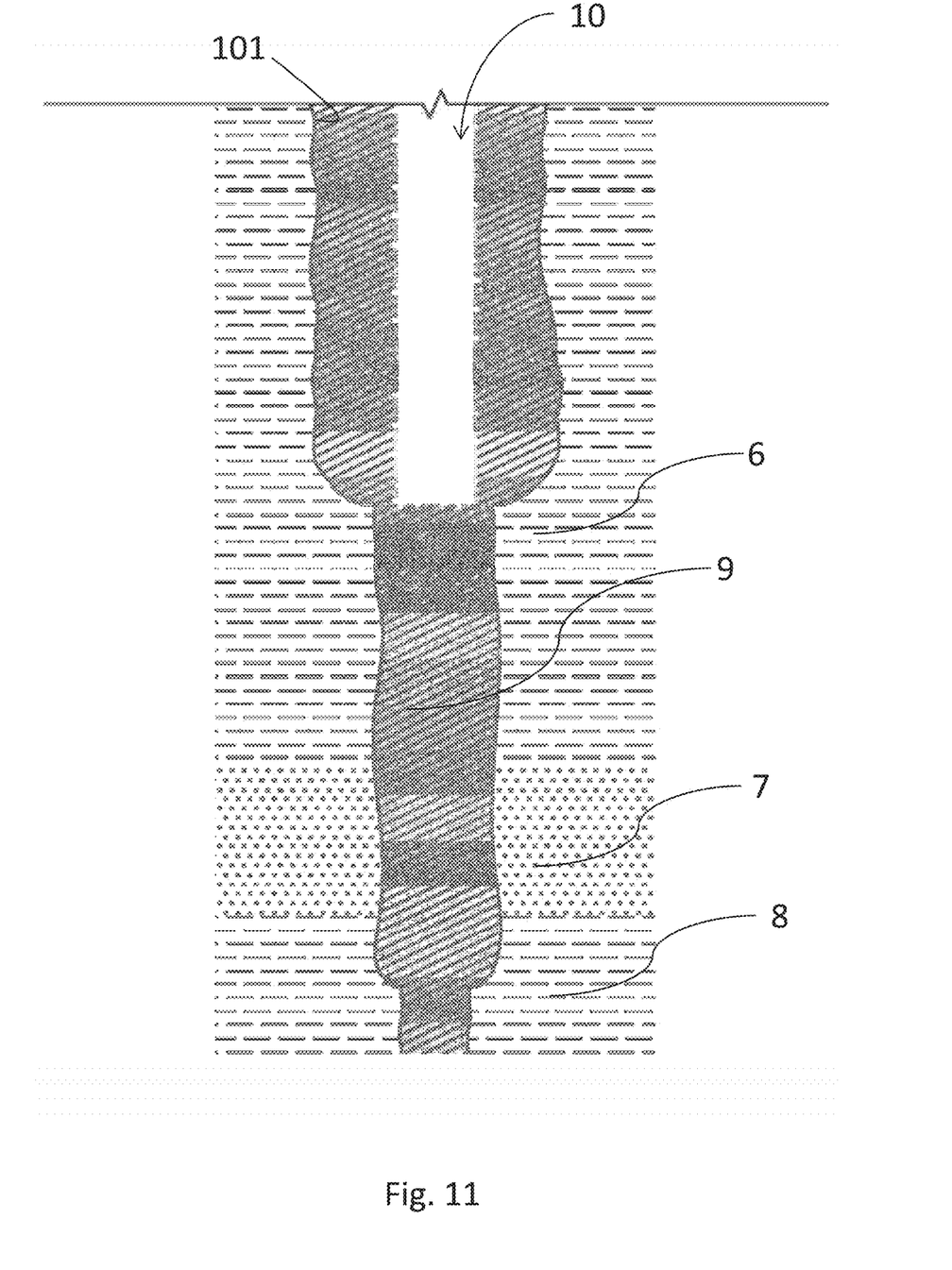
FIG. 11 shows the well of FIG. 10, with both casings removed.
Figure 12:
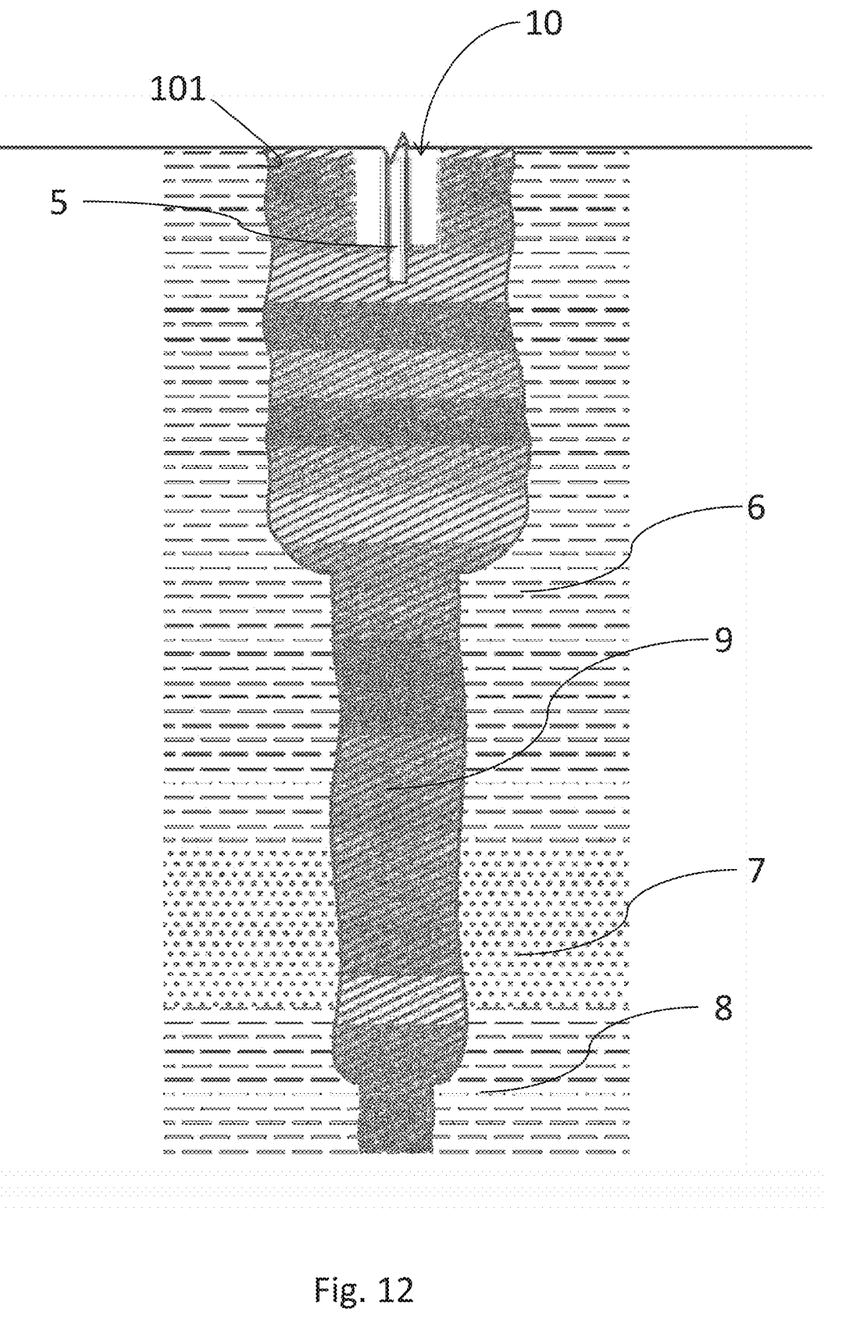
FIG. 12 shows the well almost completely filled with sealing medium.

With reference to FIG. 9, the second casing string 3, shown in FIG. 8, has been pulled out of the well 10 facilitated by the quick clay 9. Since the casing 3 was not cemented to the wall 101 of the well 10 or to the first casing string 2, the casing 3 could be removed mainly undamaged. On the Figure, the drill string 5 has been run into the well 10 and quick clay 9 is being pumped into the well 10 in order to plug it. When the quick clay 9 reaches the level of the first casing 2, see FIG. 10, the injection of quick clay 9 is discontinued, see FIG. 11, while the first casing 2 is removed. Finally, in FIG. 12, the entire well 10 is filled with quick clay 9. The quick clay 9 now constitutes one continuous plug through the entire well 10, or through an upper portion of the well 10.

It should be noted that the above-mentioned embodiments illustrate rather than limit the invention and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements.

The mere fact that certain measures are recited in mutually different dependent claims does not indicate that a combination of these measures cannot be used to advantage.

The invention claimed is:

1. A method for sealing at least a portion of a well, wherein the method comprises:
    injecting a sealing medium into the portion of the well which is to be sealed, wherein the sealing medium comprises quick clay.

2. The method according to claim 1, wherein the sealing medium is injected through a drill string.

3. The method according to claim 2, wherein at least one casing string is installed in the well.

4. The method according to claim 1, wherein at least one casing string is installed in the well.

5. The method according to claim 4, wherein the portion of the well is an annulus between the casing string and at least one of a wall of the well and an annulus between two casing strings.

6. The method according to claim 5, wherein the sealing medium is injected into the annulus during installation of the casing string in the well.

7. The method according to claim 5, wherein the drill string is provided with a mechanical plug provided with a rubber seal for sealing the space between the casing string and the drill string such that the sealing medium is prevented from flowing back along the drill string during injection of the sealing medium.

8. The method according to claim 4, wherein the drill string is provided with a mechanical plug provided with a rubber seal for sealing the space between the casing string and the drill string such that the sealing medium is prevented from flowing back along the drill string during injection of the sealing medium.

9. The method according to claim 8, wherein the sealing medium is injected into an annulus during installation of the casing string in the well.

10. The method according to claim 1, further comprising:
    filling the entire well with the sealing medium for plugging the well.

11. The method according to claim 1, wherein the method comprises:
    altering the characteristics of the sealing medium adding at least one of water, salt, sand and silt.

12. The method according to claim 1, wherein the quick clay comprises at least one of illite and chlorite.

13. A method for sealing at least a portion of a well, wherein the method, during an abandonment of the well, comprises:
    injecting a sealing medium comprising quick clay into the portion of the well which is to be sealed, wherein the portion of the well is an annulus between a casing string and at least one of a wall of the well and an annulus between two casing strings, and wherein the sealing medium is injected into the annulus during installation of one or more casing strings in the well; and
    disturbing the quick clay prior to or at the same time as pulling the one or more casing strings, such that the quick clay becomes more fluid and thus facilitates the pulling of the one or more casing strings.

14. A method for sealing at least a portion of a well, wherein the method comprises:
    injecting a sealing medium into the portion of the well which is to be sealed, wherein at least one casing string is installed in the well, and wherein the sealing medium comprises quick clay; and
    disturbing the quick clay prior to or at the same time as removing the at least one casing string from the well, so that the quick clay becomes more fluid.

15. A method for sealing at least a portion of a well, the method comprising:
   injecting a sealing medium including quick clay into the portion of the well; and
   wherein the quick clay is configured to transition from a solid state to a liquid state when agitated, and from the liquid state to the solid state when undisturbed.

16. The method according to claim 15, wherein the portion of the well is an annulus around at least one casing string installed in the well;
   wherein the quick clay is in a liquid state when it is injected into the well; and
   wherein the method further comprises allowing the quick clay to settle and solidify in the annulus.

17. The method according to claim 15, further comprising altering the characteristics of the sealing medium by adding water to decrease the viscosity of the quick clay, or salt to increase the viscosity of the quick clay.

18. A method for sealing at least a portion of a well, the method comprising:
   injecting a sealing medium including quick clay in a liquid state into the portion of the well, wherein the portion of the well is an annulus around at least one casing string installed in the well, and wherein the quick clay is configured to transition from a solid state to liquid state when agitated, and from the liquid state to the solid state when undisturbed;
   allowing the quick clay to settle and solidify in the annulus; and
   disturbing the sealing medium so that the quick clay becomes fluid prior to or at the same time as removing the at least one casing string from the well.

* * * * *